Nov. 22, 1966   H. A. SAVAGE   3,286,933
DUPLEX CHEMICAL FEEDING SYSTEM
Filed July 13, 1964   2 Sheets-Sheet 1
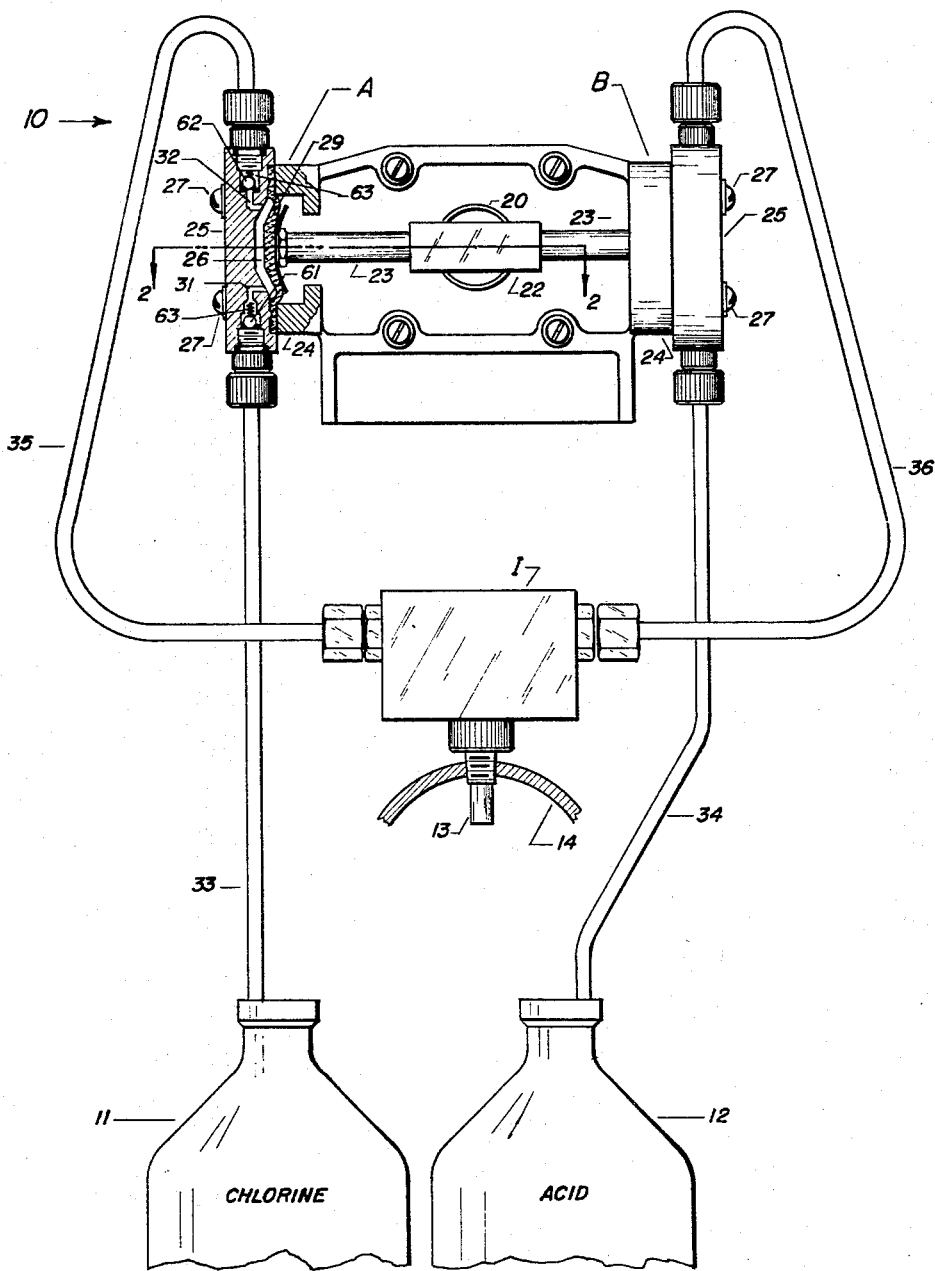
-Fig. 1-
INVENTOR.
HARRY A. SAVAGE
BY Nov. 22, 1966 H. A. SAVAGE 3,286,933
DUPLEX CHEMICAL FEEDING SYSTEM
Filed July 13, 1964 2 Sheets-Sheet 2
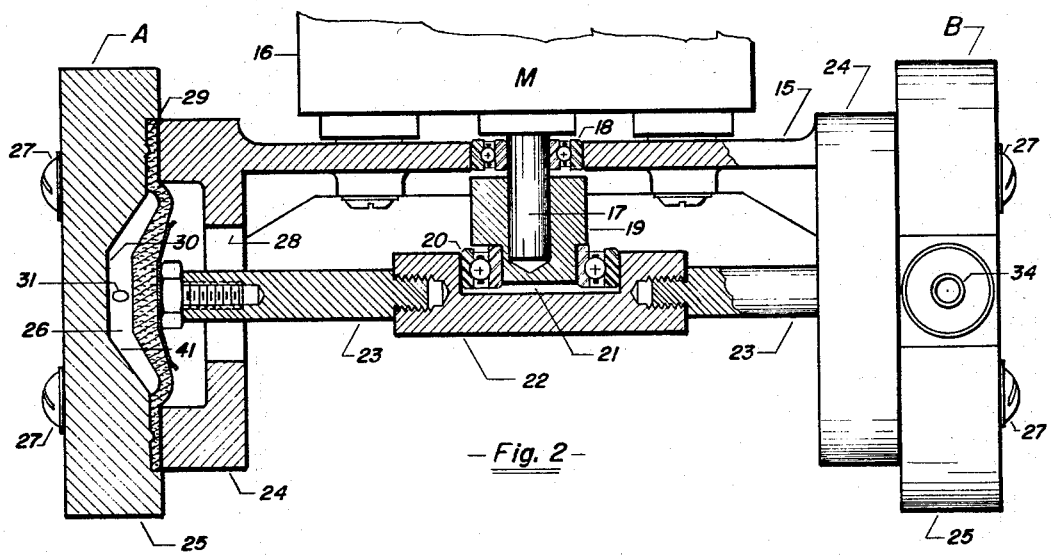
- Fig. 2 -
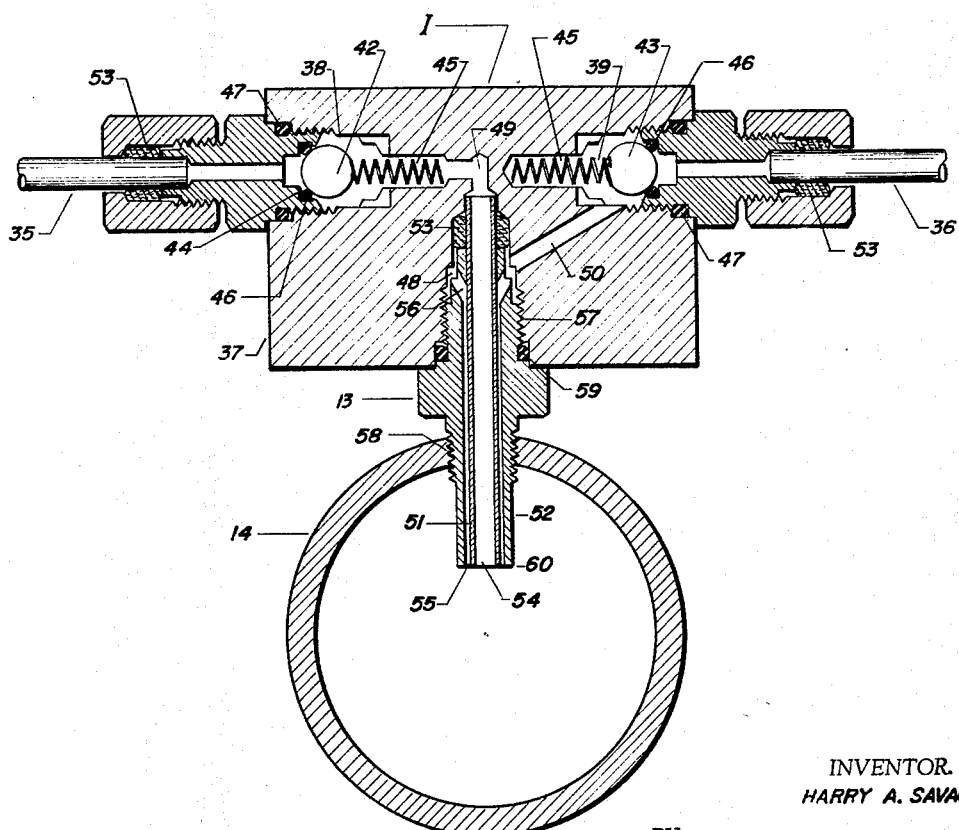
- Fig. 3 -
INVENTOR.
HARRY A. SAVAGE
BY Salvatore G. Militana,
attorney 3,286,933
DUPLEX CHEMICAL FEEDING SYSTEM
Harry A. Savage, Miami, Fla., assignor of fifty percent to
Donald W. Barlow, Miami, Fla.
Filed July 13, 1964, Ser. No. 382,098
5 Claims. (Cl. 239—304)

This invention relates to a chemical feeding system, but is more particularly directed to a system feeding a plurality of chemicals for the purification of water and the like without permitting the precipitation of hardness materials at the injection point.

My duplex chemical feed system is intended primarily for the purification of water as in pools, etc. where certain chemicals such as chlorine and the like are used to kill the bacteria in the water. However, the use of chlorine or hypochlorites causes the precipitation of certain hardness materials in the water such as calcium and magnesium which build up and occlude at the injection point and clog the passageways thereof. To prevent the formation of these precipitates, a second chemical is injected at the nozzle in a hollow cylindrical stream surrounding the injection point of the chlorine thereby preventing the precipitates from forming and if formed the second chemical will dissolve them.

Therefore, a principal object of the present invention is to provide a chemical feeding system for the purification of water with a nozzle that prevents the formation of precipitates at the injection point and therefore cannot cause the nozzle to become fouled or clogged.

Another object of the present invention is to provide a chemical feeding system with a nozzle having a pair of concentrically disposed passageways for the discharge of chemicals therethrough to the fluid being treated thereby preventing the formation and occlusion of precipitates at the injection point.

A further object of the present invention is to provide a duplex chemical feeding system with a pair of oppositely positioned flexible diaphragm type pumps whose shafts are reciprocated by a motor having an eccentric freely floating in a reciprocating block.

A still further object of the present invention is to provide a system for feeding a plurality of chemicals in equal proportions wherein the system is simple and compact in construction, most effective in use and relatively inexpensive in cost.

With these and other objects in view, the invention will be best understood from a consideration of the following detailed description taken in connection with the accompanying drawings forming a part of this specification, with the understanding however, that the invention is not confined to any strict conformity with the showing of the drawings but may be changed or modified so long as such changes or modification mark no material departure from the salient features of the invention as expressed in the appended claims.

In the drawings:

FIGURE 1 is a schematic drawing of the duplex chemical feeding system constructed in accordance with my invention with the point of injection and one of the pumps shown partially broken away.

FIGURE 2 is a fragmentary cross sectional view taken along the line 2—2 of FIGURE 1.

FIGURE 3 is a detailed cross sectional view of the injection point housing and nozzle structure.

Referring to the drawings wherein like numerals are used to designate similar parts throughout the several views the numeral 10 refers to my chemical feeding system consisting of a pump structure A and B and an injection point structure I wherein sources of chemicals 11 and 12 are pumped by pumps A and B to a nozzle 13 mounted in a fluid pipe 14 where the chemicals are placed in solution with the fluid flowing through the pipe 14.

The pump structure cosists of a mounting or support plate 15 on which is mounted a motor 16 whose shaft 17 extends through an opening 18 in the mounting plate 15. On the free end of the motor shaft 17 is an eccentric 19 with ball bearings 20 mounted thereon. The ball bearing 20 is positioned in a centrally disposed cavity 21 formed in a reciprocating block 22 at each end of which extends a pump shaft 23.

Cast integrally with the motor mounting or support plate 15 at the ends thereof are pump casings consisting of a base member 24 and a cover member 25 secured thereon by bolts 27 to form a pump chamber 26. The pump base members 24 are each provided with an opening 28 through which extend the pump shafts 23 whose ends are secured to a flexible diaphragm 29. The edge portions of the flexible diaphragm 29 are engaged and sealed by the pump cover member 25 bearing against the base member 24, the bolts 27 securing the two pump members 24 and 25 together. Each of the pump chambers 26 is provided with a flat bottom wall 30 and inclined side walls 41 which conform to the shape of the flexible diaphragm 29 to permit fluid being pumped to and from the chamber 26 to flow through inlet port 31 and outlet port 32 which communicate with the chamber 26. The inlet ports 31 of the pumps A and B are connected by appropriate fittings to pipe lines 33 and 34 which extend to tanks 11 and 12 respectively thereby permitting the pumps A and B to pump chemicals from the tanks 11 and 12. Since the outlet ports 32 are connected by appropriate fittings to pipe lines 35 and 36, these chemicals are discharged by the pumps A and B to the injection point I on each side of a block 37. To effect a pumping action of the fluids pumped into and out of the pump chamber 26, the ducts 31 and 32 are provided with ball check valves 61 and 62 respectively. The check valves 61 and 62 are spring loaded as by coil spring 63 so that the inlet valve 61 will open against the spring pressure 63 when suction is created in the chamber, while the outlet valve 62 is closed by its spring pressure 63. Then when the fluid in the chamber 26 is placed by the flexible diaphragm 29 under positive pressure, the inlet valve 61 will close while the outlet valve 62 will open to permit the discharge of fluid through the pipe line 35 to the nozzle 13.

The pipe lines 35 and 36 are connected to appropriate fittings which communicate with chambers 38 and 39 formed in the sides of the injection point block 37. Positioned in the chambers 38 and 39 are ball check valves 42 and 43 yieldingly held on their respective valve seats 44 by a coil spring 45. An O-ring 46 mounted on both of the valve seats 44 seals against leakage when the ball check valves 42 and 43 are seated. A further O-ring 47 seals the fittings of the pipe lines 35 and 36 to the block 37.

In the block 37 there is a further chamber 48 which communicates with the chambers 38 and 39 by means of the ducts 49 and 50 respectively. Mounted in the chamber 48 is the injection point nozzle 13 consisting of a pair of concentrically mounted tubular members 51 and 52 forming fluid passages 54 and 55. The passageway 54 of the inner tubular member 51 communicates with the duct 49 and is sealed as by a seal O-ring 53 to compel all of the fluid to flow from the duct 49 thru the tubular member 51 to be discharged at the free end 60 of the nozzle 13. A plurality of bores 56 formed in the side wall of the outer concentric tubular member 52 permits the fluid to flow from the duct 50 into the passageway 55 to be discharged in a hollow cylindrical spray surrounding the solid jet-like spray that is discharged through the passageway 54. The nozzle 13 is provided with threads as at 57 for mounting the nozzle 13 in the chamber 48 with an O-ring 59 sealing against leakage while threads 58 are provided to thread the nozzle 13 in the pipe 14 in order to place the nozzle tip 60 in the stream of water or other fluid flowing through the pipe 14.

In the normal use of my duplex chemical feeding system for the purification of water which is flowing through the pipe 14, the inlet pipe lines 33 and 34 are inserted into tanks 11 and 12 of chemicals, the tank 11 containing sodium hypochlorite while the tank 12 contains muriatic acid. The motor 16 is then energized causing the motor shaft 17 and the eccentric 19 to rotate. The reciprocating block 22 will now oscillate the pump shafts 23 from side to side compelling the flexible diaphragms 29 to reciprocate within the chambers 26. When the flexible diaphragm 29 of pump A moves in a direction toward the reciprocating block 22, suction is created in the chamber 26, in the inlet line 33 and outlet line 35. Since the coil springs 45 and 63 will seat the valves 42 and 63 respectively, the suction pressure will be contained in the line 33 to cause liquid chemical to be drawn from the tank 11 through the inlet line 33 through the duct 31 and into the pump chamber 26. When the eccentric 19 has rotated approximately 180 degrees, the shaft 23 and the flexible diaphragm 29 will slide in the opposite direction toward the cover member 25 applying a force on the liquid in the pump chamber 26. This causes the inlet valve 61 to close, the outlet valve 62 to open and the fluid in the pump chamber 26 to be discharged through the pipe line 35 forcing the check valve 42 to open. The fluid will flow past the valve 42 into the ducts 45, 49 and through the passageway 54 to be discharged at the nozzle tip 60 into the stream of water flowing through the pipe 14.

Since pumps A and B are on opposite ends of the reciprocating shafts 23, when the pump A is suctioning chlorine or sodium hypochloride from the tank 11 to fill its pump chamber 26, the pump B is discharging the acid that is in its pump chamber 26 through the pipe line 36 past the check valve 43 into the chamber 39 in the injection point block 37. The acid will then flow through the duct 50, openings 56 and through the passageway 55 to be discharged at the nozzle tip 60 as a hollow stream into the water flowing through the pipe 14.

Likewise, when pump B is discharging the acid to the nozzle 13, pump A will be suctioning chlorine from the tank 11 into the pump chamber 26.

It is to be noted that there is a moment when the pump A has completed its discharge phase and commencing its suction effect in the chamber 26 when chlorine or sodium hypochlorite being discharged at the nozzle tip 60 will stop, and the discharge of the acid commences. Then, the chlorine trapped in the passageway 54 in contact with the water stream would normally cause precipitation to form on the nozzle tip 60. However, the immediate flow of acid in a hollow cylindrical stream about the central passageway 54 cutting off contact between the chlorine and water, restoring the balanced pH of the water and dissolving any precipitates formed at the nozzle tip thereby cleaning the nozzle tip 60. Since this action occurs after each cycle of discharge of chlorine, the nozzle 13 will be maintained in a clean condition at all times.

What I claim as new and desire to secure by Letters Patent of the United States is:

1. A duplex chemical feeding system comprising a pair of pumps, means operating said pumps, said pumps each having an inlet and an outlet, pipe means connecting said inlets to sources of chemicals, nozzle means, said nozzle means having concentrically disposed discharge ports, outlet pipe means connected at one end to said outlets of said pumps and the other ends to said nozzle means, said nozzle means having a plurality of ducts connecting each of said other ends of said outlet pipe means and said nozzle discharge ports and check valve means mounted in said ducts controlling the flow of chemicals through said ducts and discharged by said nozzle.

2. A duplex chemical feeding system comprising a pump support having an opening, a motor shaft extending through said opening, an eccentric secured to said motor shaft, a reciprocating block having a cavity, ball bearing means mounted on said eccentric and received by said cavity for reciprocating said block, a plurality of pump shafts secured at one end to said reciprocating block, a pair of pump means having a chamber and a flexible diaphragm extending across said chamber, means securing the other end of said pump shafts to said flexible diaphragms, each of said chambers having an inlet and an outlet, pipe means connected at one end to said inlets and said outlets, the other ends of said inlet pipe means communicating with a source of chemicals, valve means mounted in said inlets and said outlets, a nozzle block, nozzle means mounted on said block, said nozzle means having concentrically disposed discharge ports, a pair of ducts in said nozzle block connecting said other ends of said outlet pipe means and said discharge ports.

3. A duplex chemical feeding system comprising a pump support having an opening, a motor shaft extending through said opening, an eccentric secured to said motor shaft, a reciprocating block having a cavity, ball bearing means mounted on said eccentric and received by said cavity for reciprocating said block, a plurality of pump shafts extending in opposite directions secured at one end to said reciprocating block, a pump secured at each end of said pump support, said pumps each having a chamber, a flexible diaphragm extending across said chambers, each of said chambers having an inlet and an outlet, pipe means connected at one end to said inlets and said outlets, the other ends of said inlet pipe means communicating with a source of chemicals, valve means mounted in said inlets and said outlets, a nozzle block, nozzle means mounted on said block, said nozzle means having concentrically disposed discharge ports, a pair of ducts in said nozzle block connecting said other ends of said outlet pipe means and said discharge ports.

4. A nozzle structure for a duplex chemical feeding system comprising an injection point block member having a plurality of chambers, separate inlet pipe means connected to each of two of said chambers, check valve means mounted in each of said last named chambers controlling the flow of fluid therethrough, a nozzle means secured at one end in one of said chambers and extending beyond said block, said nozzle means having a plurality of concentrically disposed passageways and said block having a plurality of ducts joining said pair of said chambers and said concentric passageways whereby a chemical discharged by said outer passageway of said nozzle envelopes the chemical discharged by said inner passageway.

5. A nozzle structure for a duplex chemical feeding system comprising an injection point block member having a plurality of chambers, separate inlet pipe means connected to each of two of said chambers, check valve means mounted in each of said last named chambers controlling the flow of fluid therethrough, nozzle means secured at one end in one of said chambers and extending beyond said block, said nozzle means having a plurality of concentrically disposed passageways, said block having a plurality of ducts joining said pair of said chambers and said concentric passageways and pumps means alternatingly pumping chemicals to each of said passageways whereby a chemical discharged by said outer passageways of said nozzle envelopes said inner passageway until commencement of the discharge of chemicals through said inner passageway of said nozzle.

References Cited by the Examiner
UNITED STATES PATENTS

| | | | |
|---|---|---|---|
| 1,949,934 | 3/1934 | Fulton | 210—62 |
| 1,964,245 | 6/1934 | Benedek et al. | 103—174 |
| 2,177,664 | 10/1939 | Lee | 203—88 |
| 2,359,960 | 10/1944 | Anderson | 103—38 |
| 2,936,632 | 5/1960 | Palmer | 103—174 |
| 3,043,227 | 7/1962 | Everett | 103—150 |
| 3,161,142 | 12/1964 | Reitz | 103—150 |

M. HENSON WOOD, JR., *Primary Examiner.*

C. H. SPADERNA, V. C. WILKS, *Assistant Examiners.*